United States Patent [19]

Makin

[11] Patent Number: 4,760,239

[45] Date of Patent: Jul. 26, 1988

[54] METHOD OF AND APPARATUS FOR APPLYING A MARK TO PAPER AND A PAPER FOR USE IN SUCH METHOD

[75] Inventor: Terence G. Makin, Tiverton, England

[73] Assignee: St. Regis Paper Company (UK) Limited, Devon, England

[21] Appl. No.: 866,887

[22] Filed: May 23, 1986

[30] Foreign Application Priority Data

May 28, 1985 [GB] United Kingdom ................. 8513322
Mar. 18, 1986 [GB] United Kingdom ................. 8606604

[51] Int. Cl.[4] ............................................... B23K 26/00
[52] U.S. Cl. ................................ 219/121.85; 162/110; 162/117
[58] Field of Search ..................... 219/121 LM, 121 L; 162/110, 117

[56] References Cited

U.S. PATENT DOCUMENTS

| | | | |
|---|---|---|---|
| 1,716,699 | 6/1929 | Kirkegaard | 101/32 |
| 1,874,427 | 8/1932 | Billings | 101/426 |
| 4,216,055 | 8/1980 | Watanabe et al. | 162/117 |
| 4,257,842 | 3/1981 | Ciaccia et al. | 162/117 |

FOREIGN PATENT DOCUMENTS 1489084 10/1977 United Kingdom .

*Primary Examiner*—C. L. Albritton
*Attorney, Agent, or Firm*—Arnold B. Silverman

[57] ABSTRACT

A method of applying a "pseudo watermark" to paper, comprises the steps of preparing a paper containing a suitable amount of a thermally sensitive material, the presence of which renders the translucency of the paper variable by temperature change, and subsequently applying heat to a part of the surface of the paper in a manner to cause a region of the paper to become semi-translucent. Apparatus suitable for applying heat to the paper is also disclosed.

8 Claims, 1 Drawing Sheet

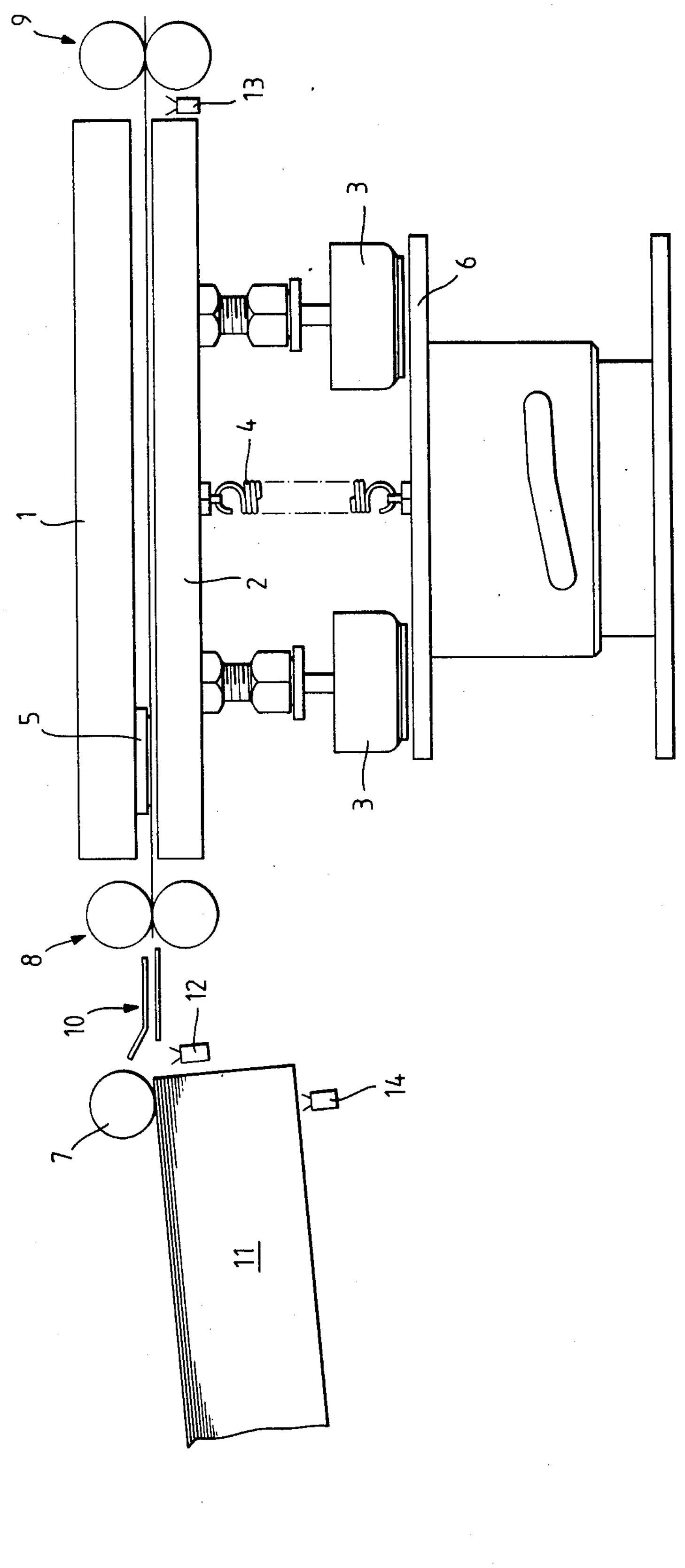
9
13
1
2
3
4
5
6
3
8
10
12
7
14
11

METHOD OF AND APPARATUS FOR APPLYING A MARK TO PAPER AND A PAPER FOR USE IN SUCH METHOD

FIELD OF THE INVENTION

The invention relates to the application of marks to paper and to a paper suitable for such application. In particular, the invention relates to the production of a "pseudo watermark", that is, a semi-translucent mark in paper similar to a traditional paper machine watermark.

BACKGROUND TO THE INVENTION AND PRIOR ART

The use of watermarks to indicate, in a discreet fashion, the manufacturer and quality of a paper is well known. However, presently available methods for applying a watermark to paper are relatively complicated and expensive. This means, in practice, that it is only economically feasible to apply watermarks to paper in a bulk process. The production of small amounts of paper with a specialised mark has heretofore been particularly expensive.

SUMMARY OF THE INVENTION

It is an object of the present invention to provide a discreet mark on paper in a manner that avoids the above problems.

Accordingly, the invention in one aspect consists in a method of applying a "pseudo watermark" to paper, which method comprises the steps of preparing a sheet or roll of a paper containing a suitable amount of a thermally sensitive material, and subsequently applying heat to a part of the surface of the paper in a manner to cause a region of the paper to become semi-translucent.

As used herein, the term "thermally sensitive material" refers to any material that, when incorporated into paper, affects the translucency of the paper in a manner such that the translucency of the paper alters irreversibly upon the application of heat to the surface of the paper.

Preferably, the paper contains from 5 to 60% of thermally sensitive material.

The thermally sensitive material is preferably one that causes the paper to exhibit a well-defined "critical temperature" for alteration of its translucency. Moreover, this critical temperature should be sufficiently high to avoid problems in the papermaking process—so that, for instance, accelerated drying techniques can be used without risk of the critical temperature being exceeded—and yet it should be sufficiently low for the heating step in the method to be conveniently performed without risk of damage to other constituents of the paper—for instance by charring—or degradation of the properties, such as colour and brightness, of the paper.

Thus the thermally sensitive material is desirably one that provides the paper with a critical temperature above about 110° C. and below about 300° C., so as to enable the heating step to be accomplished with applied temperatures of about 200° C.

A particularly suitable thermally sensitive material is a polyethylene polymer.

The heat can be applied to the surface of paper either directly or indirectly. Desirably an engraved (e.g. photo-etched) die or plate, or a mask shaped to the desired pattern, is used to apply the heat. For example, an engraved die or plate may be heated to a specific temperature, suitably above the critical temperature, prior to making contact with the surface of the paper. A particularly preferred temperature for the die lies in the range 160° to 240° C. when the thermally sensitive material is a polyethylene polymer.

Alternatively, a cut-out mask may be placed over the paper and a heat source be exposed to the paper such that only the un-masked areas of the paper are exposed to the effect of heat. For example, a suitable laser beam may be used to apply heat to the un-masked portions of the paper.

It is known to produce marking or ornamentation of relatively thick paperstock containing certain thermoplastics materials, by applying heavy pressure with a heated die to accomplish an embossing that involves a change in translucency in the embossed image. However, it is a particularly advantageous future of the present invention that, by using a very low pressure, for example up to about 80 kPa, a pseudo watermark can be applied to paper without any significant indentation of the surface of the paper.

The invention also includes apparatus suitable for performing the heating step in the method of the invention. Thus in another aspect the invention further consists in apparatus comprising means for intermittently feeding paperstock, containing a thermally sensitive material, in a transport path between die members comprising a heated marking die or plate and a backing plate; and means for closing said die members upon the paperstock therebetween while such paperstock is stationary, for a timed period appropriate to effect marking of the paperstock by application of heat to the surface thereof.

The apparatus may be adapted to feed roll paperstock and may include means operating in synchronism with said die members for cutting the paperstock into sheets. Such means may cut the paperstock in the transport path ahead of or following the die members.

Alternatively however, and as is preferred, the apparatus may be adapted to feed sheet paperstock and for this purpose comprise sheet feeding means including feeding rollers adapted to advance sheets, e.g. from a feed stack, sequentially through the transport path.

The apparatus may be controlled and have its functions co-ordinated by any suitable means. For instance operation of the feeding means may be initiated by completion of a preceding operating cycle (in continuous operation) and interrupted by sensors, such as optical sensors, detecting attainment of a paper leading edge position, and operation of, e.g., linear actuators for the die members may be controlled in synchronism with the operation of the feeding means to achieve required co-ordination.

BRIEF DESCRIPTION OF THE DRAWING

The accompanying drawing is a schematic representation of the principal components of apparatus for carrying out the heating step in the method of the invention.

DESCRIPTION OF EMBODIMENTS OF THE INVENTION

Paper suitable for use in the method of the invention comprises from 5 to 60% of a thermally sensitive material as hereinbefore defined. The present invention resides in the discovery that the inclusion of such a thermally sensitive material in an otherwise standard paper provides the paper with the property of becoming semi-translucent upon the application of the heat under minimal or zero pressure, to the surface of the paper. This realisation has enabled the application of "pseudo watermarks" to paper in a particularly elegant and economical fashion. One example of a suitable thermally sensitive material is a polyethylene polymer. The polyethylene polymer may be a high or low density polyethylene fibrid or latice. Examples of suitable polyethylene polymers are the ZON 40 and 1600 REVINEX (Trade Mark) available from Doverstrand Ltd., and SYNTHESE E790, available from Sparkford Chemicals, Southampton. The latter, for instance, is based on high density polyethylene and has a softening range that commences at about 100° C. However, only about 3% (by weight) of the polymer is affected at this temperature, softening slowly increasing with rising temperature until at about 125° C. softening of the polymer sharply increases in rate with rising temperature, softening being complete at about 137° C.

The remaining constituents of the paper may be any of the conventional papermaking materials, such as any of the normally available processed cellulosic fibres derived from trees, cotton, flax, hemp, esparto, straw; for example, cotton linter pulp, softwood bleached kraft, hardwood bleached kraft, and any suitable filler, such as china clay or chalk. The precise composition of the paper, and in particular the amount of thermally sensitive material therein, will depend upon the degree of translucency desired and upon the operating parameters of the die or mask being used to apply the mark. Dyes, pigments and sizing agents may be incorporated as required. The presence of the thermally sensitive material does not significantly affect the papermaking process save in that care must be exercised to avoid exceeding the critical temperature, e.g. during drying.

The paper may be made on a conventional Foudrinier-type papermaking machine or on any similar type of wet laid forming device. The produced paper is substantially indistinguishable from similarly produced papers and may be finished, sheeted and printed, both before and after pseudo watermarking, by normal methods.

Thus the paper properties may be designed to suit a particular end use by selection of ingredients and their proportions, and choice of manufacturing conditions, as in conventional papermaking. Image quality of the pseudo watermark has been found to depend mainly upon the proportions of the synthetic (thermally sensitive) material and mineral filler, image quality being enhanced by high proportions of synthetic material and degraded by large proportions of mineral.

For example, SYNTHESE E790 may be incorporated in a cellulose fibre blend up to 50% by weight; beyond this addition, mechanical strength is sufficiently reduced in the finished paper product to create handling problems. At addition levels below 10% it is difficult to effect a clearly defined pseudo watermark image. It has been found that the optimum level of addition of SYNTHESE E790 is 18–20%. Tables A and B below show the ingredients used, and the proportions by weight, for papers found to work satisfactorily in the apparatus hereinafter described.

TABLE A

| | |
|---|---|
| SYNTHESE E790 | 24.5% |
| Bleached Softwood Kraft | 11.4% |
| Bleached Softwood Sulphite | 12.3% |
| Bleached Hardwood Kraft | 22.8% |
| Cotton Linters | 10.6% |
| Calcium Carbonate | 18.0% |
| Sizing Agent | 0.4% |
| | 100.0% |

TABLE B

| | |
|---|---|
| SYNTHESE E790 | 18.9% |
| Bleached Softwood Kraft | 15.2% |
| Bleached Softwood Sulphite | 16.6% |
| Bleached Hardwood Kraft | 30.3% |
| Cotton Linters | 13.6% |
| Calcium Carbonate | 5.0% |
| Sizing Agent | 0.4% |
| | 100.0% |

The paper may be dyed during manufacture; this will give the pseudo watermark image an intensified but translucent coloured effect, enabling specific design requirements to be fulfilled. The SYNTHESE E790 however does not readily accept normal papermaking dyestuffs. Dye therefore fixes preferentially to the cellulose fibers resulting in poor colour uniformity or mottle which gets worse with increasing proportions of SYNTHESE. However, for certain applications this need not be a disadvantage.

Once a suitable paper has been prepared, a pseudo watermark may be formed by the application of heat in any desired pattern. For example, a traditional die, engraved to a desired pattern, may be used. In such method the engraved die is heated to a temperature between 100° and 300° C., the specific temperature being determined by the desired result and the particular composition. In practice it has been found that a temperature of 200° to 240° C. achieves good results with papers containing SYNTHESE E790. Lower temperatures, of the order of 160° C. are suitable for the other polyethylene polymers mentioned above.

Because the marking results from softening and reshaping of the synthetic fibres in the paper, the results obtained are determined both by die temperature and the duration of the die application, lower temperatures requiring longer applications, and conversely.

Thus the die is brought into contact with the surface of the paper and is held there, under low pressure just sufficient to ensure proper contact, for a period of time sufficient, at the die temperature chosen, to achieve the desired amount of translucency in the regions of the paper underlying the die. The pressure at which the die is applied to the paper is selected to avoid embossing the paper. Desirably a pressure of not more than about 76 (kPa)(11 psi) is used if no significant indentation of the paper is to result.

In place of a traditional engraved die, a photomechanical process plate may be used to apply a pseudo watermark to the paper. For example, a magnesium photo-etched plate, the etching of the plate being produced from suitable artwork to define the shape of the desired mark, may be used in a manner similar to an engraved die. The photo-etched plate is placed into a stamping machine, having suitable heating elements, and heated to an appropriate temperature. The heated plate is then brought into contact with the surface of the paper for an appropriate time and at an appropriate pressure to achieve the desired mark.

Alternatively, a mask, having cut-out portions shaped in the manner of the desired pseudo watermark may be used. In such method a heat source, such as a laser beam, may be used to apply heat to the unmasked regions of the paper, for appropriate periods, to achieve the desired marking.

The following example will help further to illustrate the invention;

EXAMPLE

A series of papers were prepared on a conventional papermaking machine to comprise 10% cotton linter pulp, from 12 to 25% treated pulp containing ZON 40 or 1600 REVINEX, approximately 15% softwood bleached kraft, approximately 28% hardwood bleached kraft plus an appropriate amount of a chalk filler. The relative proportions of softwood and hardwood bleached kraft were varied slightly depending upon the amount of polyethylene pulp used. The resultant paper was cut into sheets in a conventional way.

A magnesium plate, photo-etched to show the desired mark, was mounted in a stamping machine and heated to a temperature of approximately 150° to 160° C. When this temperature was reached the heated plate was brought into contact with the surface of the paper for approximately 0.5 second at a minimal pressure. The resultant mark had an appearance very similar to that of a traditional watermark.

With papers prepared from SYNTHESE E790 pulp to the formulations shown in Tables A and B above, similar results were achieved by the use of a photo-etched plate at a temperature of 200° to 240° C.

Simple apparatus to perform the pseudo watermarking upon paperstock as above described is illustrated in the accompanying drawing. This machine comprises, in principle, a modified diestamping press the upper platen 1 of which is heated, e.g. electrically, with suitable thermostatic control. The lower platen 2 of the press is supported on linear actuators 3 that can raise the platen 2 against the tension of a return spring 4. An engraved die 5, or equivalent photo-etched plate, is supported by the platen 1. The actuators 3 are carried by a bedplate 6 that is adjustable relatively to the platen 1 to allow for paper thickness variations.

The apparatus further comprises feeding means comprising a feed roller 7 and drive rollers 8, 9 for feeding paper sheets sequentially along a transport path comprising paper guides 10 and the space between the platens 1, 2 of the press. The feed roller 7 engages the top sheet of a stack in a feed tray 11 when the latter is raised to initiate feeding of a sheet. The feed roller may be continuously or intermittently driven.

The drive rollers 8 and 9 are intermittently driven through, for instance, magnetic clutches, under the control of optical sensors 12, 13, to advance a sheet into the required position relative to the die 5, to hold the sheet there while the press closes for a prescribed period to accomplish pseudo watermarking of the sheet, and thereafter to transfer the marked sheet (when the press reopens) to a collection device (not shown).

A further sensor 14 detects the absence of paper in the feed tray 11.

A machine constructed on the principles described can, for instance, operate to pseudo watermark up to about 2000 sheets per hour.

The invention has been found to provide significant benefits. In particular, because individual dies, masks or etched plates can be produced at a relatively small cost, a small number of sheets having individual mark designs can be prepared at economical rates by, for instance, jobbing printers and small printshops.

It will be appeciated that any thermally sensitive material that, when included as a constituent of paper, causes the paper to become translucent as a result of the application of a heat source, may be used.

I claim:

1. A method of applying a "pseudo watermark" to paper, which method comprises the steps of preparing a sheet or roll of paper containing a suitable amount of a thermally sensitive material, and subsequently applying heat to a part of the surface of the paper in a manner to cause a region of the paper to become semi-translucent.

2. The method of claim 1, in which the paper contains from 5 to 60% of thermally sensitive material.

3. The method of claim 1, in which the thermally sensitive material is a polyethylene polymer.

4. The method of claim 1, in which the heat is applied directly to the surface of the paper.

5. The method of claim 4, in which a heated die or plate is used to apply heat to the surface of the paper.

6. The method of claim 5, in which the die or plate is applied to the surface of the paper at pressure in the range of from 0 to 80 kPa.

7. The method of claim 1, in which heat is applied to produce a paper surface temperature in the range 100° to 300° C.

8. The method of claim 7, in which heat is applied to produce a paper surface temperature in the range 200° to 240° C.

* * * * *